Figure 1:
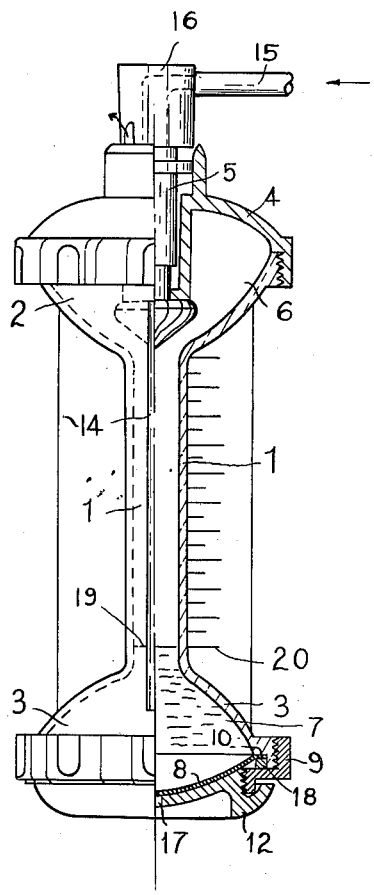

May 15, 1962 H. M. SUNDBERG 3,034,866
GAS ANALYZER
Filed Oct. 2, 1959

INVENTOR.
Hardy Mikael Sundberg
BY
Pierce, Scheffler & Parker
Attorneys 3,034,866
GAS ANALYZER
Hardy Mikael Sundberg, Savedalen, Sweden, assignor to Hardy Maskinprodukter Aktiebolag, Savedalen, Sweden, a corporation of Sweden
Filed Oct. 2, 1959, Ser. No. 844,022
1 Claim. (Cl. 23—256)

This invention relates to a gas analyzer of the type comprising a reservoir adapted to be filled with an absorbent liquid, a gas chamber, a vertically disposed measuring tube communicating at its lower end with the reservoir and at its upper end with the gas chamber, and a calibrated scale associated with the measuring tube.

To obtain accurate measurements with gas analyzers of this type, means have to be provided for registering the zero mark of the scale with the meniscus of the absorbent liquid in the measuring tube prior to the admission of gas into the analyzer. To this end it has been suggested to connect a calibrated strip displaceably with the tube so that it can be readily raised and lowered a certain amount to register the zero mark with the meniscus of the absorbent liquid. However, since the normal or zero position of the level of the liquid can vary considerably so that the zero mark of the scale may have to be positioned at a considerable distance above the lower end of the tube, the length of the tube and hence the total height of the analyzer must be comparatively great in order to have a sufficient distance available between the zero mark in its uppermost position and the upper end of the tube. Further, to adjust the calibrated strip one or more screws have to be loosened and tightened again which requires a comparatively long time.

It is the primary object of the invention to provide an improved analyzer which has smaller overall dimensions and is more easily manipulated than previously known analyzers of the type indicated. The novel features and advantages of the invention will appear from the following description in conjunction with the accompanying drawing in which FIG. 1 is a partially sectional vertical view of an analyzer constructed in accordance with the invention, and FIG. 2 illustrates a partial sectional view of two details of the analyzer.

Referring to the drawing, reference numeral 1 denotes a transparent measuring tube which advantageously consists of a suitable plastic and has two flared end sections 2 and 3. The upper end section 2 is closed by a detachable cover 4 provided with a valve device 5. The space 6 defined by the end section 2 and the cover 4 is the gas chamber of the analyzer. The liquid reservoir 7 of the analyzer is defined by the lower end section 3 and a flexible diaphragm 8 the edge of which is held in contact with an abutting face 10 of the lower end section 3 by means of a gland or fitting 9 which is screwed onto a threaded part of the section 3. A sealing ring 18 is inserted between the fitting 9 and the edge of the diaphragm 8. The fitting 9 has internal threads 11 for a correspondingly threaded plug 12 which has holes 17 and an inner surface 13 which in the position shown in FIG. 1 abuts the outside of the diaphragm 8. It will be obvious from FIG. 1 that the plug 12 can be screwed up and down in the fitting 9 to change the volume of the reservoir 7 without interfering with the sealing ring 18.

Vertically disposed between the end sections 2 and 3 are four stiffening strips 14 which increase the strength of the analyzer against breakage. One of these strips has a calibrated scale the zero mark of which is indicated at 20.

Figure 2:
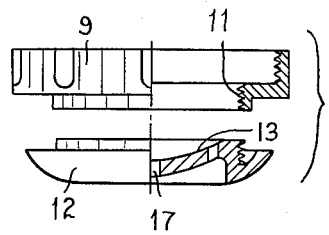

FIG. 1 shows the analyzer adjusted to receive a gas, such as flue gas, to be analyzed to determine the percentage of, for instance, carbon dioxide contained therein. The liquid level 19 registers with the zero mark 20 of the scale. The gas to be analyzed is supplied through a flexible conduit 15 and a detachable fitting 16 and enters the gas chamber through the valve device 5 which in one position admits gas to the gas chamber and prevents the gas from entering the tube 1. The gas is pumped into the gas chamber until the gas completely forces the air out of the chamber, as indicated by the arrow to the left of the fitting 16, and fully fills the chamber. During this time, the valve device 5 is in its lowermost end position in which it shuts off the communication between the gas chamber 6 and the tube 1. Thereafter the fitting 16 is removed and the valve device returns to its upper end position in which the gas inlet and air outlet are closed and the gas chamber 6 communicates with the tube 1, as shown in FIG. 1. To accelerate the action of the absorbent liquid, the analyzer may now be inverted and shaken so that the gas is thoroughly mixed with the liquid. The resultant reduction in the gas volume produces a sub-atmospheric pressure in the analyzer. Since the diaphragm 8 is exposed through the openings 17 to atmospheric pressure, it will flex inwardly until a pressure balance is reached. When the analyzer is placed in its normal upright position, the liquid will raise in the tube 1 an amount which is substantially equal in volume to the volume by which the gas has been absorbed. Consequently, the height of the liquid in the tube 1 is indicative of the percentage of carbon dioxide in the analyzed flue gas.

As previously mentioned, it is necessary for the meniscus of the liquid prior to the analyzing operation always to have a position registering with the zero mark of the calibrated scale. In accordance with the invention, a fixed calibrated scale is associated with the tube 1 and the level of the liquid in the reservoir 7 is adjusted by means of the plug 12 which can be screwed more or less into the fitting 9 so as to decrease or increase the volume of the reservoir and to raise or lower the meniscus 19 of the liquid. Such adjustment is mainly necessary in view of different volume expansion coefficients of the absorbent liquid and analyzer. Since the zero mark 20 is disposed but slightly above the lower end of the tube 1, the entire length of the tube is available for changes in volume of the liquid. The cross-sectional area of the tube is considerably smaller than the area of the diaphragm 8. In effect, the tube may have very small cross-sectional area which results in a very high accuracy of measurement.

It will be understood that the details of construction may be modified within the scope of the appended claim.

What I claim is:

A gas analyzer comprising a transparent measuring tube having flared sections at its normally upper and lower ends, a cover detachably secured to the upper flared end of said tube and forming therewith a gas chamber, a valve in said cover which is operative in one position to admit gas to said gas chamber while preventing it from entering said tube and to permit air to be forced out of said chamber by the entering gas and in another position to prevent the entry of gas into and the exit of air from said chamber and to open said chamber to said tube, a flexible diaphragm closing the lower flared end of said tube and forming therewith a liquid reservoir, a fitting securing the edge of said diaphragm to the edge of said lower flared end of said tube, said fitting being annular in shape and having a threaded opening therein and a threaded perforated plug fitted into said threaded opening and engaging said diaphragm whereby the liquid level in said tube may be adjusted by adjustment of said threaded plug.

References Cited in the file of this patent
UNITED STATES PATENTS

| | | |
|---|---|---|
| 1,111,815 | Westover | Sept. 29, 1914 |
| 2,363,027 | Vayda et al. | Nov. 21, 1944 |
| 2,867,510 | Zapp | Jan. 6, 1959 |